United States Patent
Nomura et al.

(10) Patent No.: US 6,598,411 B2
(45) Date of Patent: Jul. 29, 2003

(54) VEHICLE AIR CONDITIONING HEAT EXCHANGER SEAL

(75) Inventors: Toshiaki Nomura, Kariya (JP); Makoto Nomura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/245,031

(22) Filed: Sep. 17, 2002

(65) Prior Publication Data

US 2003/0051497 A1 Mar. 20, 2003

(30) Foreign Application Priority Data

Sep. 18, 2001 (JP) ........................................ 2001-283609

(51) Int. Cl.[7] ................................................ B60H 1/32
(52) U.S. Cl. ........................................................ 62/239
(58) Field of Search .......................... 62/239; 277/394, 277/648

(56) References Cited

U.S. PATENT DOCUMENTS

| | | | | |
|---|---|---|---|---|
| 4,049,281 A | * | 9/1977 | Bainard | 277/307 |
| 4,119,325 A | * | 10/1978 | Oakley et al. | 277/642 |
| 4,305,780 A | * | 12/1981 | Black | 159/16.1 |
| 4,440,401 A | * | 4/1984 | Olschewski et al. | 277/384 |
| 4,515,574 A | * | 5/1985 | Mazziotti | 464/131 |
| 4,848,035 A | * | 7/1989 | Sakuma et al. | 49/490.1 |
| 5,213,342 A | * | 5/1993 | Weber | 277/644 |
| 5,243,836 A | * | 9/1993 | Spring | 62/499 |
| 5,632,328 A | * | 5/1997 | Sawyer et al. | 165/69 |
| 5,954,578 A | * | 9/1999 | Takasaki | 454/121 |
| 6,375,195 B1 | * | 4/2002 | Robotham | 277/394 |
| 6,450,503 B1 | * | 9/2002 | Dossena et al. | 277/572 |
| 6,494,463 B1 | * | 12/2002 | Rank | 277/607 |

FOREIGN PATENT DOCUMENTS

| | | | |
|---|---|---|---|
| EP | 0458122 A2 | * | 11/1991 |
| GB | 2103732 A | * | 2/1983 |
| JP | B2-57-187211 | | 11/1982 |

* cited by examiner

*Primary Examiner*—William E. Tapolcai
*Assistant Examiner*—Mohammad M. Ali
(74) *Attorney, Agent, or Firm*—Harness, Dickey & Pierce, PLC

(57) ABSTRACT

A vehicle air conditioning system in which a sealing member is provided with, as an integral part, plates of main lips and sub-lips that are pressed against an air conditioning case in such a manner that the sub-lips stem from the surfaces of the plates. Since the sub-lips are formed to branch from the surfaces of the plates, which form the main lips, the stiffness of the main lips can be improved when rubbed against the air conditioning case when an evaporator (heat exchanger) is inserted into the air conditioning case. Accordingly, unwanted deformation occurring at the end portions of the respective main lips can be controlled, thereby making it possible to enhance the sealing ability of the sealing member for sealing a clearance between the air conditioning case and the evaporator.

8 Claims, 6 Drawing Sheets

SEGMENT INDICATED BY ARROW A

⟨BEFORE INSERTION⟩

4A-4A

⟨AFTER INSERTION⟩

4B-4B

ENLARGED SEGMENT C

VEHICLE AIR CONDITIONING HEAT EXCHANGER SEAL

CROSS REFERENCE TO RELATED APPLICATION

This application is based upon, claims the benefit of priority of, and incorporates by reference the contents of prior Japanese Patent Application No. 2001-283609 filed Sep. 18, 2001.

BACKGROUND OF THE INVENTION

1. Field of the Invention

The present invention relates to a vehicle air conditioning system to be mounted on a vehicle. More specifically, the air conditioning system is provided with a sealing member for sealing a clearance between an air conditioning case and a heat exchanger.

2. Description of the Related Art

Generally, a sealing member is attached to the periphery of a heat exchanger installed inside an air conditioning case, so that any clearance between the heat exchanger and the air conditioning case is sealed to prevent air leakage. As shown in a related art arrangement of FIG. 7, a plate (32) with lip (38), which undergoes elastic deformation when pressed against the air conditioning case, is formed integrally with a sealing member (30).

In the situation where a heat exchanger (20) in installed inside the air conditioning case by inserting the heat exchanger (20) in the longitudinal direction (a direction indicated by an arrow E of FIG. 7) of the lip (38), the lip (38) rubs against the air conditioning case during insertion and receives a shear force Ps. Consequently, deformation in the longitudinal direction E occurs at the end portion of the lip (38). This deformation readily results in a clearance between the lip (38) and the air conditioning case, which further results in deterioration of the sealing ability of the sealing member (30) between the lip (38) and the air conditioning case.

SUMMARY OF THE INVENTION

The present invention is devised in view of the foregoing, and therefore, has an object to enhance the sealing ability of a sealing member for sealing a clearance between an air conditioning case and a heat exchanger.

In order to achieve the above and other objects, a first aspect of the present invention provides a vehicle air conditioning system having an air conditioning case defining an air channel, a heat exchanger to be installed inside the air conditioning case for exchanging heat with air passing through the air channel, and a sealing member attached to a periphery of the heat exchanger for sealing a clearance between the heat exchanger and the air conditioning case. The sealing member is provided with, as an integral part thereof, plates of main lips and sub-lips that undergo elastic deformation when pressed against the air conditioning case. The sub-lips are formed to branch from surfaces of the plates forming their respective main lips.

According to a first aspect of the invention, since the sealing member is provided with the sub-lips in addition to the main lips, more portions can be sealed against the air conditioning case in comparison with a conventional sealing member provided with the main lips alone, thereby making it possible to enhance sealing.

Also, when the heat exchanger is inserted into the air conditioning case in a longitudinal direction of the sealing member, since the sub-lips are formed to branch from the surfaces of the plates forming their respective main lips, the stiffness of the main lips can be enhanced to resist a shear force Ps applied when the heat exchanger is rubbed against the air conditioning case during insertion. Hence, unwanted deformation occurring at the end portions of the main lips can be controlled, thereby making it possible to enhance the sealing ability of the sealing member.

Incidentally, the lip extending in a longitudinal direction is linked directly to the lip extending in a lateral direction in the conventional sealing member, and therefore, these lips interfere with each other when they undergo elastic deformation. Such interference causes unwanted deformation in close proximity to the corner meeting portion of the lips, which impairs the sealing ability.

By taking this into account, a second aspect of the invention is configured in such a manner that the sealing member has a corner portion extending to bend at nearly a right angle along a corner portion of the heat exchanger and connecting the main lip extending in a longitudinal direction and the main lip extending in a lateral direction, and that the corner portion is formed as a thin film that is thinner than the main lips.

According to the second aspect, when the main lips undergo elastic deformation when being pressed against the air conditioning case, the corner portion can be readily folded, which makes it possible to control interference between the main lips. Hence, the occurrence of unwanted deformation in close proximity to the corner portion of the main lips can be controlled, thereby making it possible to enhance the sealing ability of the sealing member.

A third aspect of the invention is configured in such a manner that a notch is formed in the sealing member at a boundary portion between the main lip extending in a longitudinal direction and the main lip extending in a lateral direction. According to the third aspect, the main lip extending in the longitudinal direction and the main lip extending in the lateral direction can undergo elastic deformation when being pressed against the air conditioning case without interfering with each other. Consequently, the occurrence of unwanted deformation in close proximity to the corner portion of the main lips can be controlled, thereby making it possible to enhance the sealing ability of the sealing member.

A fourth aspect of the invention is configured in such a manner that more than one sub-lip is provided to each of the main lips. According to the fourth aspect, not only can further portions be sealed onto the air conditioning case, but also the stiffness of the main lips can be further improved against a shear force Ps, thereby making it possible to further enhance the sealing ability of the sealing member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description will describe an embodiment of a vehicle air conditioning system of the present invention with reference to FIGS. 1 through 6. The following description is merely exemplary in nature and is in no way intended to limit the invention, its application, or uses.

Figure 1:
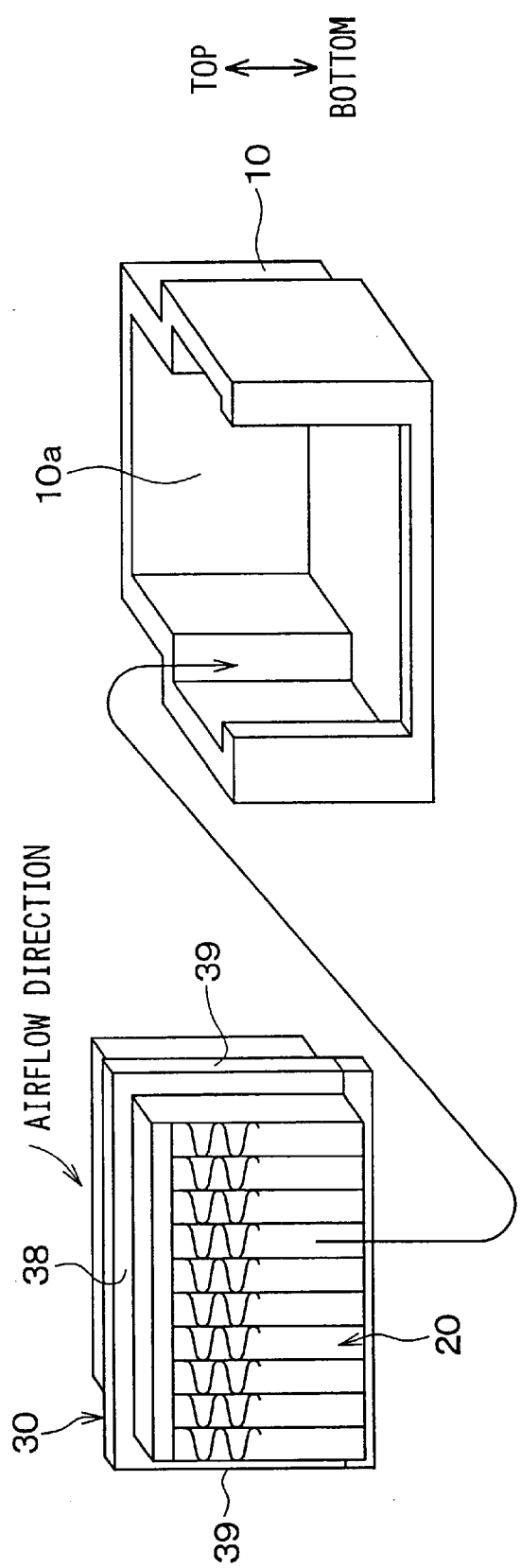
FIG. 1 is an exploded perspective view showing an air conditioning case and an evaporator of an air conditioning system according to an embodiment of the present invention.

FIG. 1 is an exploded perspective view showing an air conditioning case and an evaporator (cooling heat exchanger) of an air conditioning system. An interior unit of the vehicle air conditioning system is composed of an air conditioning case 10 made of resin and defining an air channel 10a and an evaporator (heat exchanger) 20 installed therein. The air conditioning case 10 shown in FIG. 1 is divided into top and bottom portions and only the bottom portion is illustrated herein. The evaporator 20 is inserted and attached inside the air conditioning case 10 in a direction (vertical direction of FIG. 1) in parallel with a core surface 20a of the evaporator 20, so that it stands nearly upright and thereby cuts across the entire air channel 10a.

The air conditioning case 10 is provided with an opening portion (unillustrated) at the rear (inner side) on the sheet plane of FIG. 1, so that air blown by a blower (unillustrated) flows into the air conditioning case 10 through the opening portion and passes through the evaporator 20 from the back to the front on the sheet plane.

Figure 2:
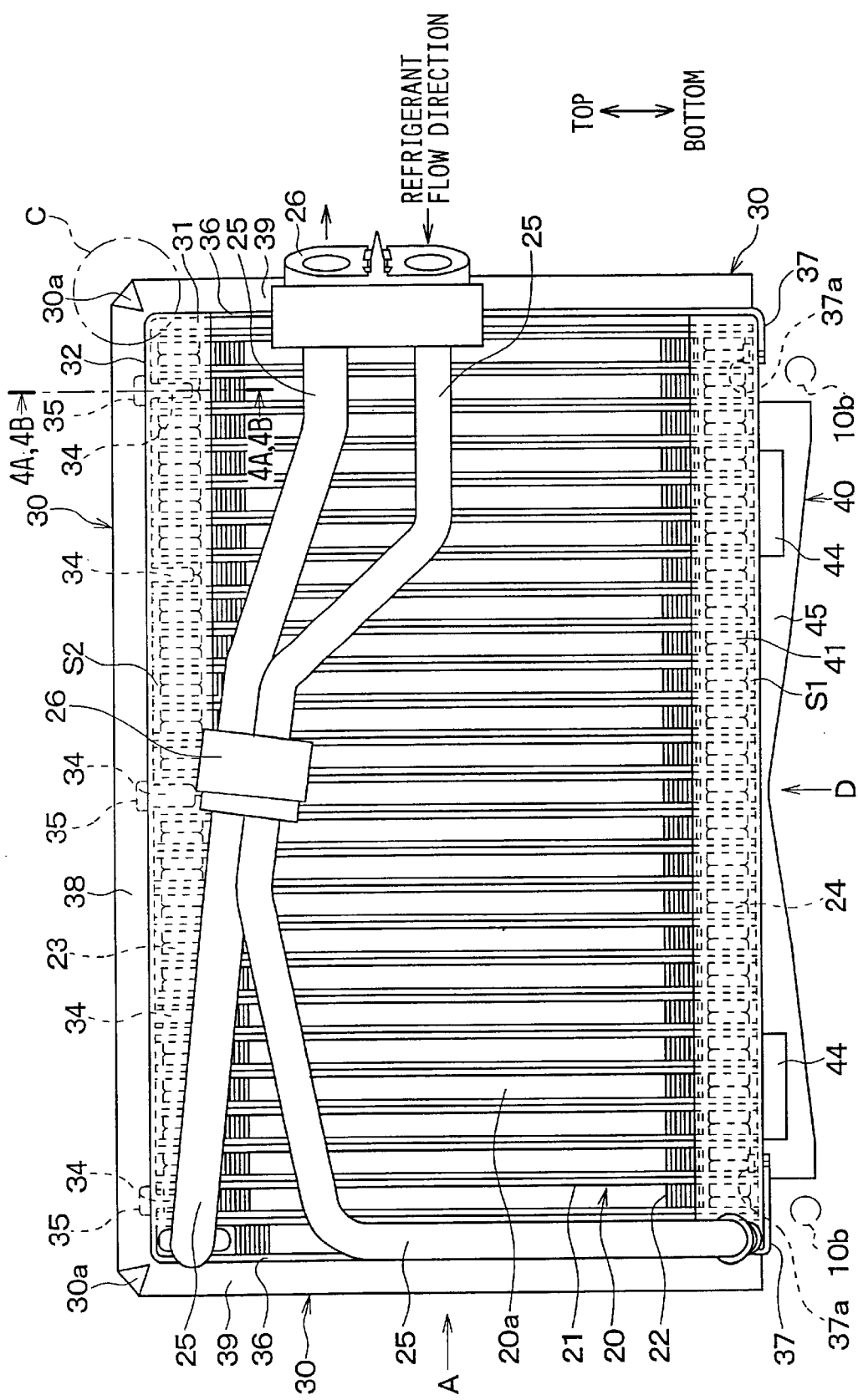
FIG. 2 is a front view showing the evaporator from an upstream airflow perspective.
Figure 3:
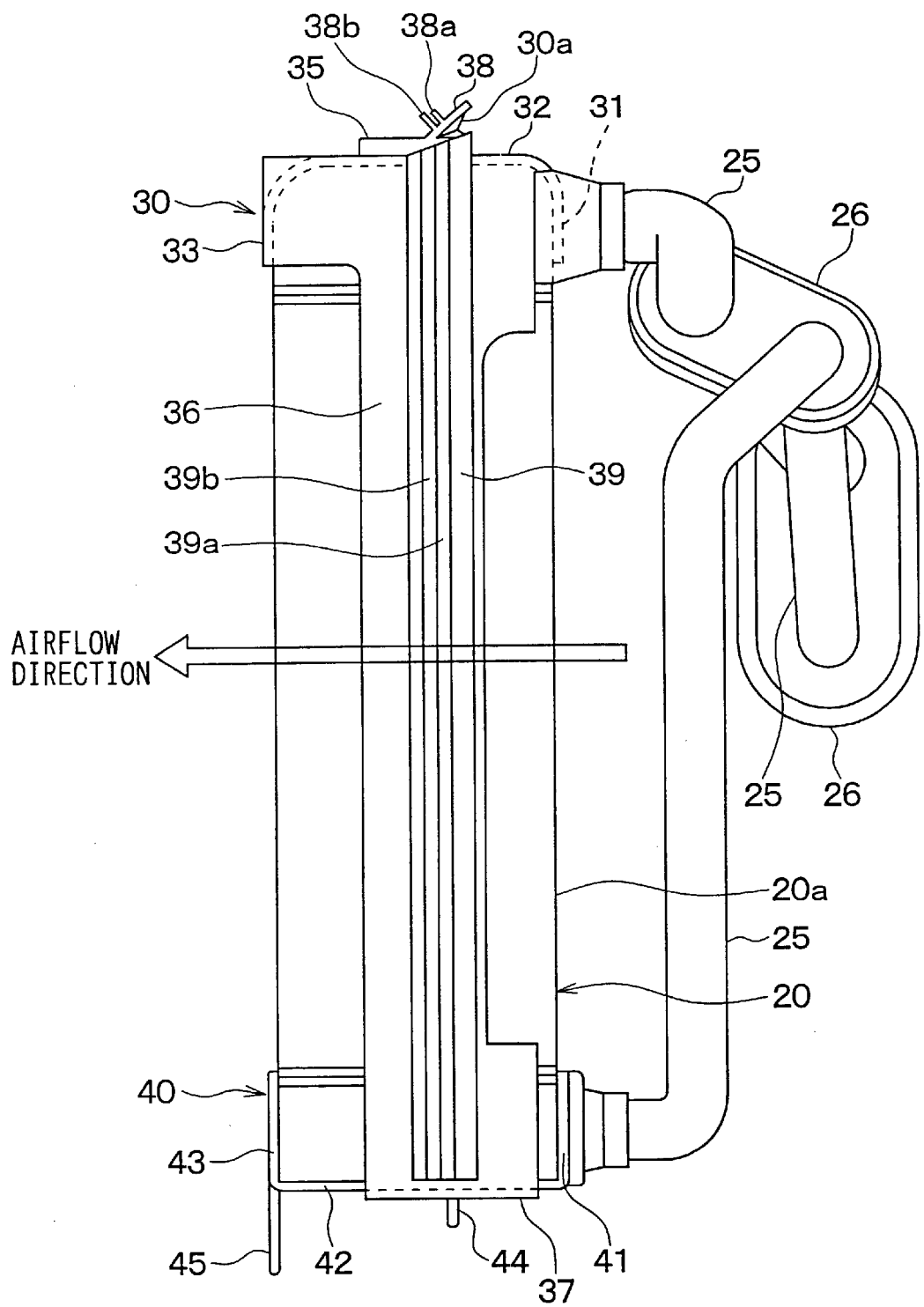
FIG. 3 is a view showing a segment indicated by an arrow A of FIG. 2.

FIG. 2 is a front view showing the evaporator 20 when viewed from the upstream side of airflow, and FIG. 3 is a view showing a segment indicated by the arrow A of FIG. 2. The evaporator 20 is of a type generally known as a stacked type. Each flat tube 21 is formed by laminating two metal thin plates made of aluminum in the thickness direction, with the flat surface parallel to the airflow. The evaporator 20 is a brazed single-piece unit formed by alternately stacking a predetermined number of flat tubes 21 and corrugated fins 22 in the horizontal direction as shown in FIG. 2. The flat tubes 21 and corrugated fins 22 together form a heat exchanging core portion where heat is exchanged with blown air passing through the air channel 10a.

Also, as has been described above, the evaporator 20 is installed inside the air conditioning case 10 so that it stands nearly upright. In other words, it is arranged in such a manner that blown air flows through the heat exchanging core portion in the horizontal direction and the longitudinal direction of the flat tubes 21 is aligned in, or almost in, the vertical direction.

Also, an upper tank portion 23 and a lower tank portion 24 are formed respectively at the top and bottom end portions of the metal thin plates that form the respective flat tubes 21. The tank portions 23 and 24 are composed of bowl-like protruded portions formed integrally with the metal thin plates at the top and bottom end portions, respectively, and the latter distributes a refrigerant into a plurality of the flat tubes 21 while the former collects the refrigerant from the plurality of the flat tubes 21.

Refrigerant pipes 25 are connected to the respective tank portions 23 and 24, and a block joint 26 is connected to the refrigerant pipes 25. The refrigerant pipes 25 are connected further to a known refrigerating cycle, so that the refrigerant flows in and out from the tanks 24 and 23, respectively.

A sealing member 30 made of rubber is attached to the top and side surfaces on the periphery of the evaporator 20 in a manner so that it can be attached and detached. The sealing member 30 seals a clearance between the top and side surfaces of the evaporator 20 and the air conditioning case 10 to prevent leakage of blown air (the structure of the sealing member 30 will be described below in detail).

On the other hand, at the bottom surface on the periphery of the evaporator 20, a covering member 40 made of resin to have a nearly horseshoe-shaped cross section is attached to the lower tank portion 24 in an manner so that it can be attached and detached. The horseshoe-shaped cross section of the covering member 40 is composed of three parts consisting of a front surface wall portion 41, a bottom surface wall portion 42, and a rear surface wall portion 43.

The front surface wall portion 41 is formed to cover the upstream portion of airflow in the lower tank portion 24 along its length in the horizontal direction of FIG. 2. The bottom surface wall portion 42 is a portion positioned below the lower tank portion 24, and has many drains 42a (see FIG. 5) for discharging condensed water formed in the evaporator 20. The rear surface wall portion 43 is formed to cover the downstream portion of airflow in the lower tank portion 24 along its length in the horizontal direction of FIG. 2.

In addition, the bottom surface wall portion 42 is provided with three ribs 44 and 45 all protruding downward. By allowing these ribs 44 and 45 to touch the bottom surface of the air conditioning case 10, it is possible to determine a position of the lower side of the evaporator 20 with respect to the air conditioning case 10 through the covering member 40 to be fixed. The rib 45 is formed to extend also in the horizontal direction of FIG. 2, and by allowing the end surface of the rib 45 to touch the bottom surface of the air conditioning case 10, it is possible to seal a clearance between the bottom surface on the periphery of the evaporator 20 and the air conditioning case 10 to prevent leakage of blown air.

Incidentally, foreign matter including dust is mixed into air blown into the evaporator 20, and the foreign matter impinges on the flat tubes 21 and the corrugated fins 22 of the evaporator 20 while they pass through spaces in the flat tubes 21 and the corrugated fins 22, thereafter falling downward and depositing at a lower location. However, since the front surface wall portion 41 covers the front surface side of the lower tank portion 24 of the evaporator 20, the front surface wall portion 41 prevents the foreign matter from adhering onto the lower tank portion 24 of the evaporator 20, thereby making it possible to prevent corrosion of the lower tank portion 24 caused by the foreign matter. Also, according to the arrangement described above, the lower tank portion 24 is covered with the front surface wall portion 41 and the rear surface wall portion 43, which makes it possible to prevent blown air from leaking through a clearance S1 between the lower tank portion 24 and the bottom surface wall portion 42.

As indicated by an alternate long and short dash line of FIG. 2, discharge ports 10b for drained water are formed in the air conditioning case 10 at the side portions of the rib 45. Condensed water is dropped from the drains 42a and flows on the bottom surface of the air conditioning case 10 from the upstream side to the downstream side of the airflow, and is discharged outside the air conditioning case 10 through the discharge ports 10b.

Figure 4A:
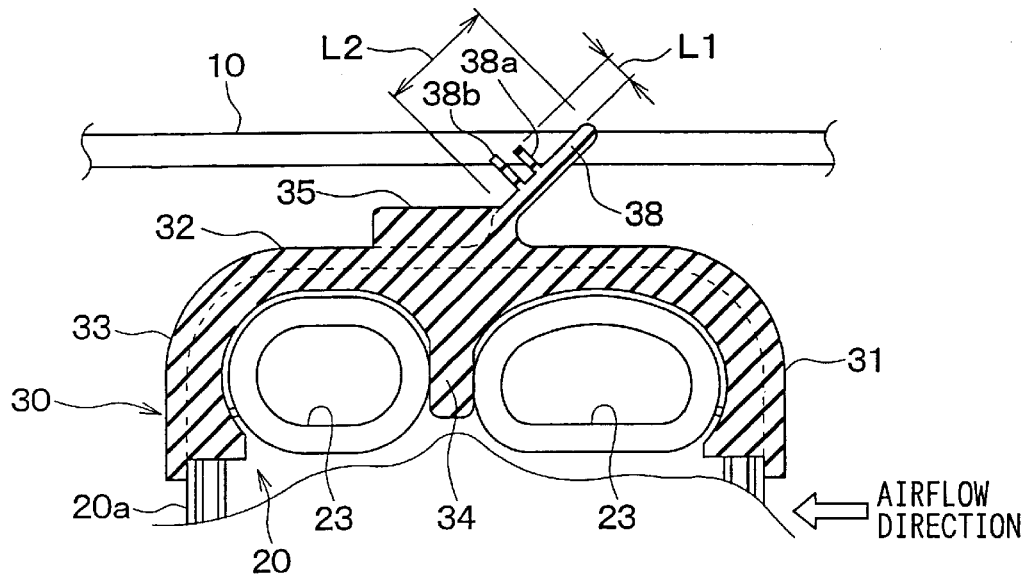
FIG. 4A is a cross-sectional view taken along line 4A—4A of FIG. 2 before the evaporator is inserted into the air conditioning case.
Figure 4B:
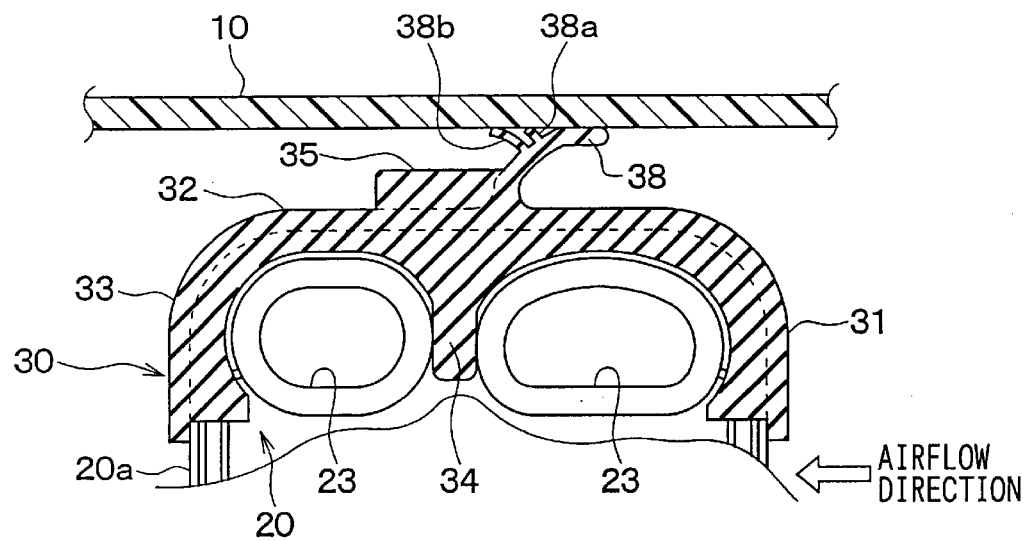
FIG. 4B is a cross-sectional view taken along the line 4B—4B of FIG. 2 after the evaporator is inserted into the air conditioning case.

Next, the following will describe the structure of the sealing member 30 in detail. FIGS. 4A and 4B are cross-sectional views taken along the line 4A,4B–4A,4B of FIG. 2. FIG. 4A shows a state before the evaporator 20 is inserted into the air conditioning case 10, and FIG. 4B shows a state after the evaporator 20 is inserted into the air conditioning case 10. As shown in FIGS. 4A and 4B, a portion of the sealing member 30 positioned over the top surface of the evaporator 20 is composed of three parts including a front surface portion 31, a top surface portion 32, and a rear surface portion 33 to form a nearly horseshoe-shaped cross-sectional view.

The front surface portion 31 is formed to cover the upstream portion of airflow in the upper tank portion 23 along its length in the horizontal direction of FIG. 2. Also, the rear surface portion 33 is formed to cover the downstream portion of airflow in the upper tank portion 23 along its length in the horizontal direction of FIG. 2. Consequently, the upper tank portion 23 is covered with the front surface portion 31 and the rear surface portion 33, which makes it possible to prevent blown air from leaking through a clearance S2 between the upper tank portion 23 and the top surface portion 32.

Also, a nearly m-shaped extended portion 34 (see FIGS. 4A and 4B) that extends downward from the top surface portion 32 and is fit into the outer circumference surface of the upper tank portion 23 is provided to five places (see FIG. 2) on the top surface portion 32. This arrangement makes it possible to prevent the sealing member 30 from being displaced with respect to the upper tank portion 23.

Also, a protruded portion 35 that protrudes upward from the top surface portion 32 to touch the air conditioning case 10 is provided to three places (see FIG. 2) on the top surface portion 32. By allowing the protruded portions 35 to touch touched portions (not shown) of the air conditioning case 10, not only can the evaporator 20 be retained inside the air conditioning case 10, but also vibrations propagating through the air conditioning case 10 will not propagate directly to the evaporator 20.

Also, the sealing member 30 is provided with side surface portions 36 that extend downward from each end of the top surface portion 32 extending in the horizontal direction of FIG. 2, so that they extend in the vertical direction on the side surfaces of the evaporator 20.

Figure 5:
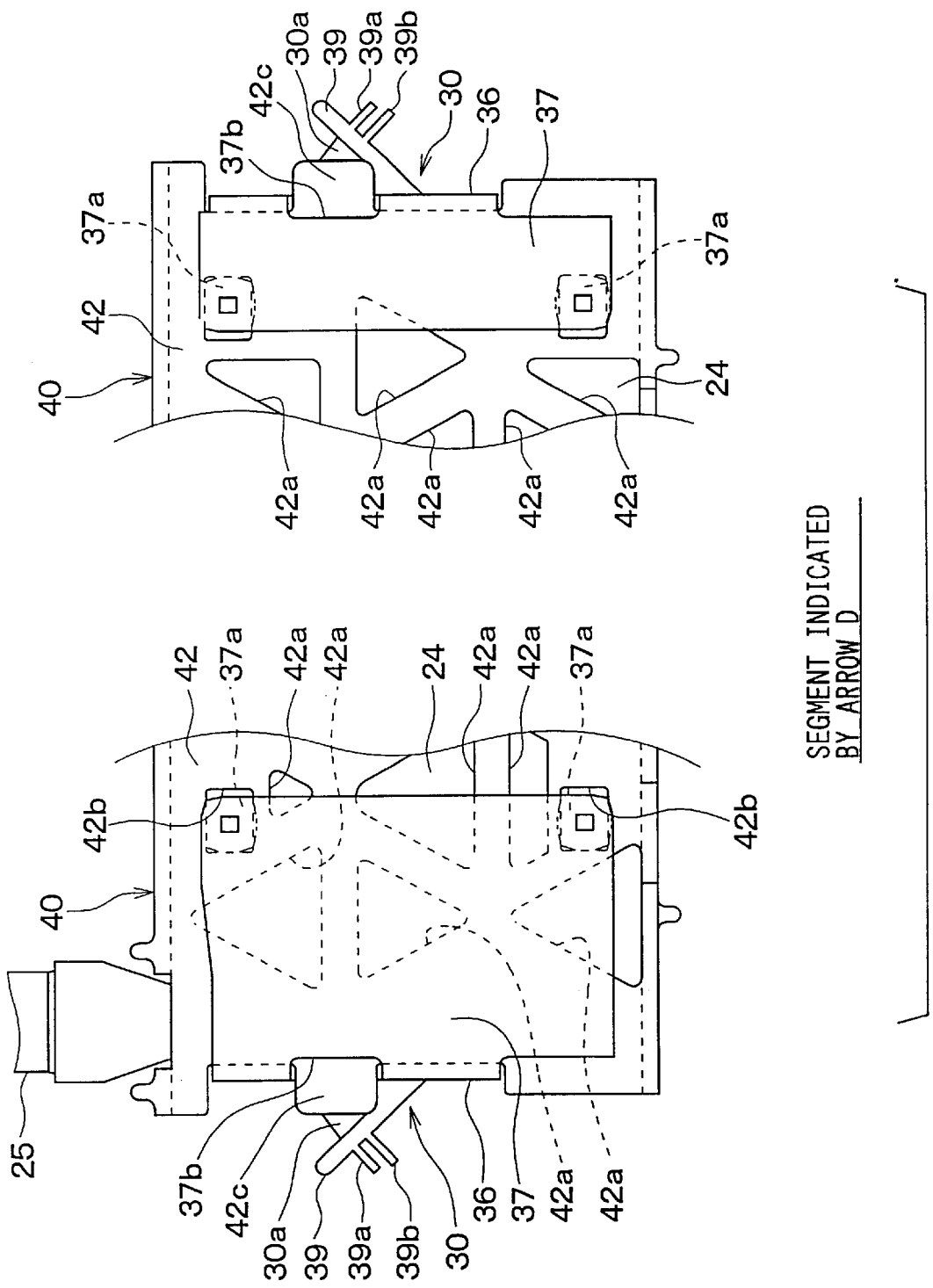
FIG. 5 is a view showing a segment indicated by arrow D of FIG. 2.

FIG. 5 is a view showing a segment indicated by arrow D of FIG. 2. The sealing member 30 is provided with, as an integral part thereof, bottom surface portions 37 that extend from the bottom ends of the respective side surface portions 36 along the bottom surface of the lower tank portion 24 so as to cover the covering member 40. Each bottom surface portion 37 is provided with an engagement portion 37a protruding upward and an opening portion 37b being opened downward, which respectively engage with an opening portion 42b and an engagement portion 42c formed in the bottom surface wall portion 42 of the covering member 40, whereby the covering member 40 is attached to the evaporator 20 in an attachable and detachable manner.

Also, as shown in FIG. 2, the sealing member 30 is provided with, as an integral part, a plate and top surface main lip 38 extending upward from the top surface portion 32 and also in the horizontal (lateral) direction of FIG. 2. Additionally, plates of side surface main lips 39 extend sideways from the respective side surface portions 36 and also in the vertical (longitudinal) direction of FIG. 2.

Additionally, as shown in FIGS. 4A and 4B, plates of two top surface sub-lips 38a and 38b are formed integrally with the top surface main lip 38 as being branched from the surface of the plate forming the top surface main lip 38. The top surface main lip 38 and the top surface sub-lips 38a and 38b undergo elastic deformation when pressed against the air conditioning case 10. This arrangement makes it possible to seal a clearance between the upper tank portion 23 and the air conditioning case 10 so that blown air does not leak through the clearance.

Further, as shown in FIG. 5, plates of two side surface sub-lips 39a and 39b are formed integrally with each side surface main lip 39 as being branched from the surface of the plate forming the side surface main lip 39, and the side surface main lips 39 and the side surface sub-lips 39a and 39b undergo elastic deformation when pressed against the air conditioning case 10. This arrangement makes it possible to seal a clearance between the side surfaces of the evaporator 20 and the air conditioning case 10 so that blown air does not leak through the clearance. Furthermore, since the sealing member 30 is provided with the sub-lips 38a, 38b, 39a, and 39b in addition to the main lips 38 and 39, additional portions can be sealed onto the air conditioning case 10 in comparison with a conventional sealing member provided with the main lips 38 and 39 alone, thereby making it possible to enhance the sealing ability.

Moreover, when the evaporator 20 is inserted into the air conditioning case 10, since the side surface sub-lips 39a and 39b are formed to branch from the surfaces of the plates forming their respective side surface main lips 39, the stiffness of the side surface main lips 39 can be enhanced against a shear force Ps applied when the side surface main lips 39 rub against the air conditioning case 10 during insertion. Hence, unwanted deformation occurring at the end portions of the side surface main lips 39 can be controlled, thereby making it possible to enhance the sealing ability of the sealing member 30.

Figure 6:
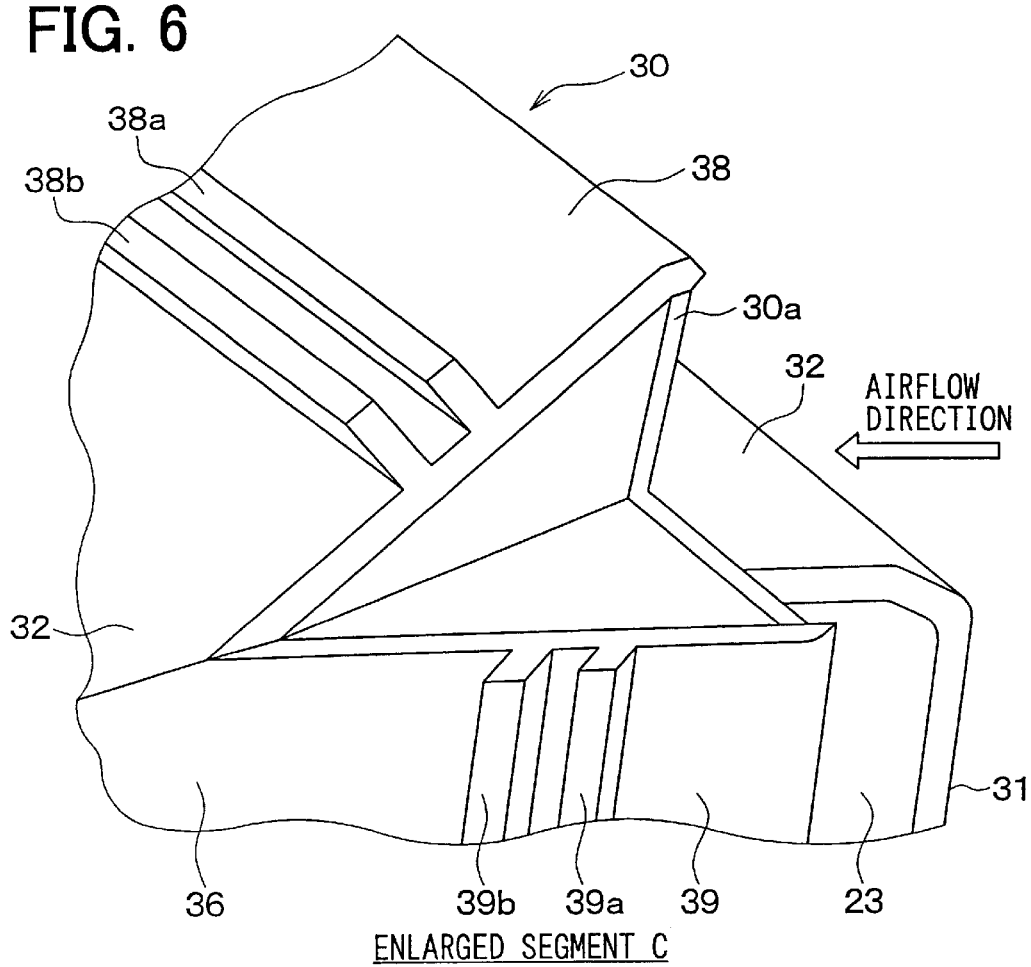
FIG. 6 is an enlarged perspective view showing segment C of FIG. 2.

FIG. 6 is an enlarged perspective view showing a segment C of FIG. 2. A corner portion 30a bent at nearly a right angle along the corner portion of the evaporator 20 is formed as an integral part of the sealing member 30 at the boundary between the top surface portion 32 and each side surface portion 36. The corner portions 30a link the top surface main lip 38 and the side surface main lips 39. Each corner portion 30a is formed as a thin film thinner than either of the main lips 38 and 39.

Accordingly, when the main lips 38 and 39 undergo elastic deformation when being pressed against the air conditioning case 10, the corner portions 30a easily fold, which makes it possible to control interference between the main lips 38 and 39. Consequently, the occurrence of unwanted deformation in close proximity to the corner portions 30a of the main lips 38 and 39 can be controlled, thereby making it possible to enhance the sealing ability of the sealing member 30.

Also, the corner portions 30a can ensure sealing at the boundaries between the top surface lips 38, 38a, and 38b and the side surface lips 39, 39a, and 39b thereby reliably preventing leakage of blown air through the boundaries.

Incidentally, the plates forming the main lips 38 and 39 are approximately 2 mm thick, the plates forming the sub-lips 38a, 38b, 39a, and 39b are approximately 1 mm thick, and the film forming the corner portions 30a are approximately 0.5 mm thick. It is suitable to set the film thickness of the corner portions 30a to half or less than half the plate thickness of the main lips 38 and 39.

Although a mold is used in molding the sealing member 30, because the corner portions 30a are formed as thin films, there is a concern whether a rubber material sufficiently fills a mold during molding. Hence, in the present embodiment, portions of the mold that will form the corner portions 30a are evacuated, so that the rubber material is reliably and sufficiently filled into the corner portions 30a.

Figure 7:
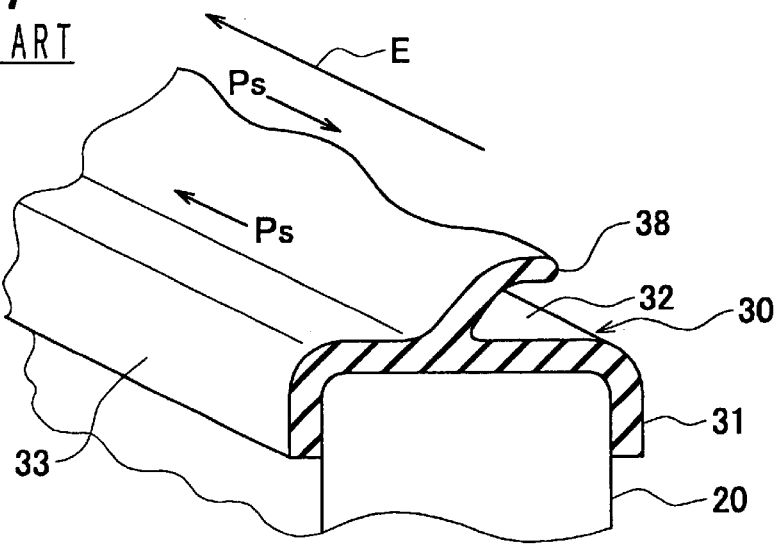
FIG. 7 is a perspective view showing a related art sealing member.

Also, as shown in FIG. 4A, an outwardly extending length L1 of the sub-lips 38a, 38b, 39a, and 39b is set shorter than an outwardly extending length L2 of the main lips 38 and 39. According to this arrangement, deformation in the direction indicated by the arrow E of FIG. 7 occurs less frequently in the sub-lips than in the main lips. Hence, in the event that deformation occurs in the main lips, the sub-lips are capable of sealing, thereby making it possible to enhance the sealing ability of the sealing member 30.

Incidentally, in the present embodiment, of the two sub-lips 38a and 38b and the two sub-lips 39a and 39b provided to the respective main lips 38 and 39, the length L1 of the sub-lips 38a and 39a closer to the edges of the main lips 38 and 39 is set shorter than a length of the other sub-lips 38b and 39b farther from the edges.

Next, the following description will briefly describe an operation of the present embodiment arranged as above. When a fan in a blower unit (unillustrated) is activated, inside air or outside air is blown by the fan and passes through spaces in the flat tubes 21 and the corrugated fins 22 of the evaporator 20. At this point, air undergoes an endothermic reaction with a refrigerant circulating through the flat tubes 21, and becomes cool air. Then, after a temperature is adjusted by a heater core (unillustrated) or air mixing door, the cool air is blown into the cabin.

Other Embodiments

According to the embodiment above, the sealing member 30 is provided with the corner portions 30a. However, a notch may be formed in the sealing member 30 at the boundary portion between each side surface main lip 39 and the top surface main lip 38. According to this arrangement, the corner portions 30a can be readily folded as well when the main lips 38 and 39 undergo elastic deformation when being pressed against the air conditioning case 10, which makes it possible to control interference between the main lips 38 and 39.

In the case of forming notches as described above, the sealing ability deteriorates at the boundaries between the top surface lips 38, 38a and 38b and the side surface lips 39, 39a, and 39b when compared with the case of having the corner portions 30a. However, by way of compensation, molding of the sealing member 30 can be simpler due to omission of the corner portions 30a. Also, two sub-lips are provided to the respective main lips 38 and 39 in the embodiment above. However, in the present invention, it is sufficient to provide at least one sub-lip to the respective main lips 38 and 39.

Further, the evaporator 20 is used in the embodiment above as the heat exchanger of the present invention. However, the evaporator 20 may be replaced with a heater core for heating blown air. In this case, the present invention can be applied suitably to a re-heating type heater core installed to cut across the entire air channel 10a. Furthermore, the evaporator 20 is installed to stand nearly upright in the embodiment above. Additionally, the present invention is applicable to a case where the evaporator 20 is installed to lie down or be positioned substantially horizontally.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system, comprising:
   an air conditioning case defining an air channel;
   a heat exchanger, installable inside said air conditioning case, for exchanging heat with air passing through said air channel; and
   a sealing member attached to a periphery of said heat exchanger for sealing a clearance between said heat exchanger and said air conditioning case, wherein
   said sealing member is provided integrally with plates of main lips and sub-lips that undergo elastic deformation when pressed against said air conditioning case, and
   said sub-lips are formed to branch from surfaces of the plates forming their respective main lips.

2. The vehicle air conditioning system according to claim 1, wherein:
   said sealing member has a corner portion extending to bend at nearly a right angle along a corner portion of said heat exchanger and connecting the main lip extending in a longitudinal direction and the main lip extending in a lateral direction; and
   said corner portion is formed as a thin film thinner than said main lips.

3. The vehicle air conditioning system according to claim 1, wherein more than one sub-lip is provided to each of said main lips.

4. The vehicle air conditioning system according to claim 2, wherein more than one sub-lip is provided to each of said main lips.

5. A vehicle air conditioning system, comprising:
   an air conditioning case defining an air channel;
   a heat exchanger, installable inside said air conditioning case, for exchanging heat with air passing through said air channel; and
   a sealing member attached to a periphery of said heat exchanger for sealing a clearance between said heat exchanger and said air conditioning case, said sealing member further comprising:
   a main lip; and
   a plurality of sub-lips located adjacent to each other, wherein said main lip and said plurality of sub-lips undergo elastic deformation when pressed against said air conditioning case.

6. The vehicle air conditioning system of claim 5, wherein said sub-lips are formed to branch from said main lip.

7. The vehicle air conditioning system of claim 6, wherein said sub-lips are each formed at a 90 degree angle to a surface of said main lip.

8. The vehicle air conditioning system of claim 7, wherein said sub-lips are of unequal lengths when each is measured from said main lip.

* * * * *